United States Patent [19]

Duncan

[11] Patent Number: 4,577,883
[45] Date of Patent: Mar. 25, 1986

[54] VEHICLE TOW BAR

[76] Inventor: Lee H. Duncan, 88806 Greenhill Rd., Eugene, Oreg. 97402

[21] Appl. No.: 630,702

[22] Filed: Jul. 13, 1984

[51] Int. Cl.$^4$ .............................................. B60D 1/14
[52] U.S. Cl. .............................................. 280/491 D
[58] Field of Search ........... 280/478 R, 478 A, 478 B, 280/491 R, 491 A, 491 C, 491 D, 491 F, 482

[56] References Cited

U.S. PATENT DOCUMENTS

| | | | |
|---|---|---|---|
| 3,105,706 | 10/1963 | Adam | 280/491 D |
| 3,281,163 | 10/1966 | Wiebe | 280/491 D |

Primary Examiner—John A. Pekar
Attorney, Agent, or Firm—Oliver D. Olson

[57] ABSTRACT

A vehicle tow bar comprises a longitudinally extending, tubular cross bar mounted laterally across the front of the vehicle to be towed, the cross bar mounting for longitudinal movement thereon, pivotal rotation thereabout, and laterally pivotal movement relative thereto, a longitudinally extensible, two section telescoping reach having a hitch coupler mounted on its forwardmost end arranged for connection to an associated hitch ball component on a tow vehicle. A pair of tow chains connect opposite longitudinal ends of the cross bar to the forwardmost end of the reach and are arranged to become taut when the reach is extended to a desired maximum length. A locking screw on the rear section of the reach releasably engages the forward section of the reach to move the latter forwardly in order to tension the chains attached thereto and to prevent inward collapsing of the telescoping sections. When not in use, the reach may be pivoted on the cross bar to a collapsed position whereby it overlies the cross bar and is locked thereon. A chain tray is provided to hold the chains while the assembly is in collapsed, storage position.

7 Claims, 9 Drawing Figures

VEHICLE TOW BAR

BACKGROUND OF THE INVENTION

This invention relates to vehicle tow bars, and more particularly to a novel tow bar arranged to facilitate the hitching of a vehicle to be towed to a tow car.

Tow bars are known in the art, and are finding increasing popularity particularly among RV enthusiasts who often tow a car behind them so that they may have transportation other than their sizable and cumbersome campers when they have put in for a stay at a park or the like. Such conventional tow bars typically in use generally comprise a mounting bracket extending laterally across the front of the car and mounted to the frame or the bumper. An "A" frame tongue portion is attached at its wide end to laterally spaced apart points on the mounting bracket and provided for vertically pivotal movement thereon so as to accommodate upward and downward movement between the towing vehicle and the vehicle towed. The closed end of the "A" shaped tongue portion of course mounts the trailer hitch coupler, which receives the corresponding ball component mounted to the tow vehicle. When not in use, the assembly must either be unbolted and removed from the vehicle before driving, or the tongue portion pivoted upwardly and locked into position with the hitch coupler projecting well above the hood of the car forwardly of the bumper thereof.

Since no side movement or telescoping movement is provided in these typical tow bars, hooking up of the vehicle can be tedious, as precise lateral and distal positioning of the tow car relative to the front of the vehicle to be towed is essential for the hitch coupler to be able to engage the ball component. This routine either involves many trips between drivers seat and hitch to observe the attempts at positioning the vehicles until properly accomplished; a second person watching the positioning and instructing the driver what alignment corrections to make; or a fantastic amount of luck; as most persons familiar with trailering boats, campers, cars and the like seldomly seem to experience.

Art having pertinence touching upon the general problems associated with aligning vehicles to be connected together is disclosed in my earlier U.S. Pat. No. 4,057,266 issued Nov. 8, 1977 and entitled COUPLING GUIDE FOR TRAILER HITCHES.

SUMMARY OF THE INVENTION

In its basic concept, this invention provides a tow bar which is arranged to be attached to the front end of a vehicle to be trailered behind another, the tow bar also arranged for pivotal movement from side to side to allow for rapid and easy connection to a tow vehicle which is not centered precisely in front of the car to be tow, and the tow bar is further arranged to be adjustable telescopically to allow latitude in the positioning of the tow vehicle at various distances in front of the vehicle to be hitched thereto, the tow bar being lockable when in towing condition to properly guide the towed vehicle.

It is by virtue of the foregoing basic concept that the principle objective of this invention is achieved; namely, the provision of a tow bar which overcomes the disadvantages and limitations of those currently available in the art.

Another object of this invention is the provision of a tow bar of the class described which, when not in use, may be quickly and easily collapsed into a stored position which takes up a minimum amount of space adjacent and parallel to the bumper of the vehicle, providing a more slightly appearance, and does not in any manner obstruct the drivers view of the road.

Still another object of this invention is the provision of a tow bar of the class described which greatly facilitates the hitching and unhitching of vehicles to be towed while requiring the use of no tools.

Yet another object of this invention is the provision of a tow bar of the class described which is of simplified construction for economical manufacture, and ease of installation, use and maintenance.

The foregoing and other objects and advantages of this invention will appear from the following detailed description, taken in connection with the accompanying drawings of a preferred embodiment.

DESCRIPTION OF THE PREFERRED EMBODIMENT

Figures 1, 2, 9:
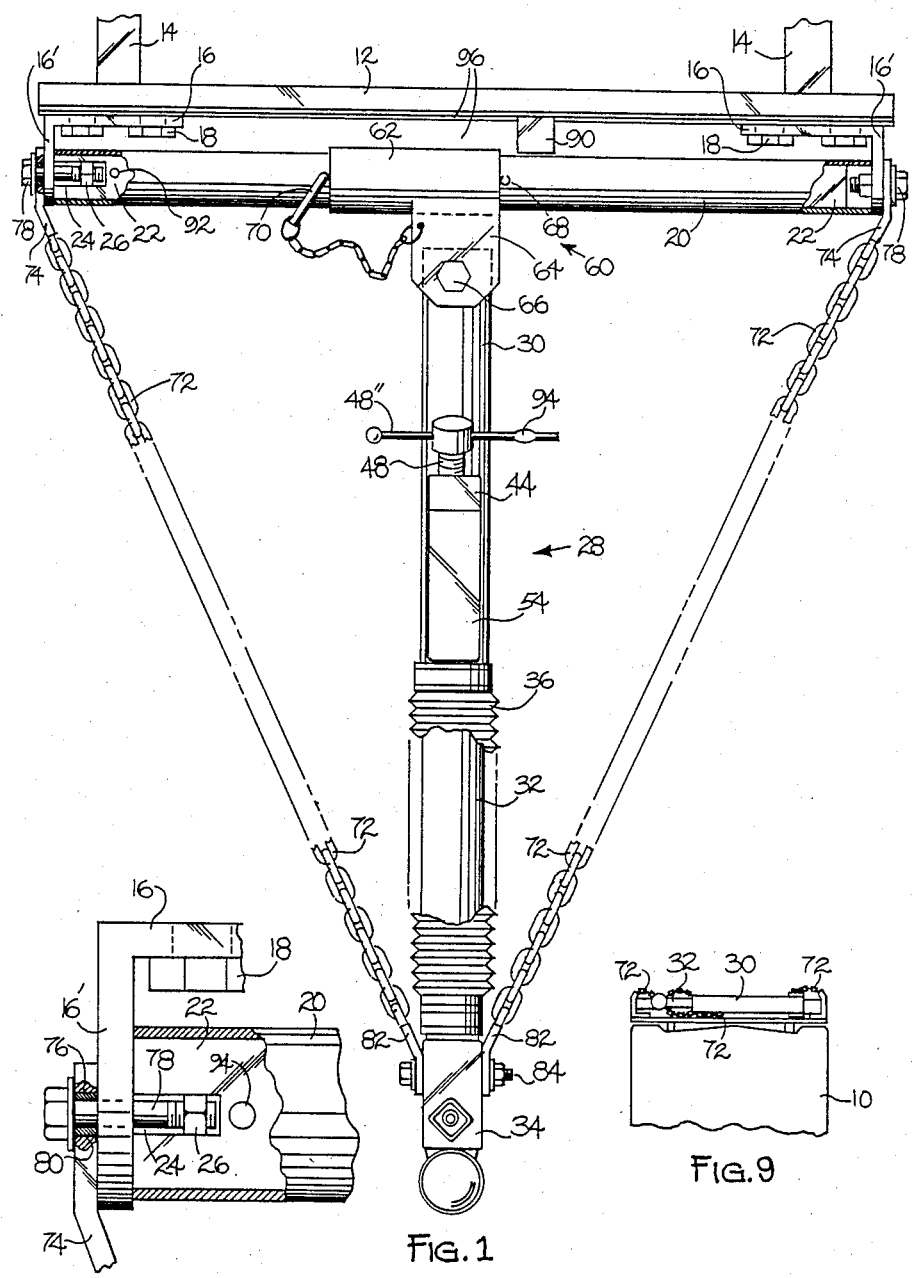
FIG. 1 is a fragmentary plan view of a tow bar embodying the features of this invention shown in partially telescoped condition, the tow bar being mounted on a mounting bracket arranged for attachment to the front frame of a vehicle to be towed.
FIG. 2 is a fragmentary plan view of one end of the main support tube of the tow bar of FIG. 1, parts being broken away to show internal detail.
FIG. 9 is a fragmentary schematic plan view of the tow bar of this invention illustrated in collapsed, stored condition as when the vehicle is not being towed and is being used for transportation.

A tow bar is mounted to the frame (not shown) of a vehicle 10 to be towed. Means by which the tow bar is anchored to a vehicle frame may comprise a mounting bracket such as the one illustrated in FIG. 1. This bracket includes a vertically disposed, laterally extending tow bar mounting plate 12 having horizontal frame struts 14 which extend rearwardly under the front of the vehicle and are bolted or welded to the frame rails of the car to be towed. The mounting plate 12 is preferably arranged, when attached to the car, to extend laterally along the front bumper disposed slightly below the front edge thereof.

The tow bar embodied herein includes a pair of L-shaped mounting members 16 arranged to be attached at their longer legs to the plate 12 by conventional means such as by bolts 18. The short ends 16' of the members 16 include a bore (not shown) therethrough, and are configured to project forwardly from the mounting bracket 12, laterally spaced apart from each other as shown.

A hollow, tubular cross member 20 mounts an internal strengthening bar 22 provided to reinforce the cross member against bending under the strain of towing. The strengthening bar 22 is disposed, as seen in the cut away portions of FIGS. 1 and 2, substantially parallel to the plane of travel over a road surface when the cross member is mounted on the mounting members 16, as will now be described.

As is seen in the drawings, the cross member 20 is received between the outwardly projecting leg portions 16' of the laterally spaced apart L-shaped mounting members 16 and is rigidly secured to the one at the right in FIG. 1 by conventional means, such as by welding. The strengthening bar 22 previously described is provided with a notched out portion 24 extending inwardly from its left end. The right end terminates inwardly of the adjacent end of the cross member 20. The notched portion is arranged to align with a bore provided through the mounting member 16. A threaded nut 26 is received within the notch 24 and welded to the bar 22, for reasons which will become apparent later.

The tow bar of this invention also includes a hitch mounting reach, illustrated generally as 28, mounted to the cross member 20 previously described. Basically, the reach comprises two longitudinally telescoping sections 30 and 32, the outer, rearward section 30 receiving the rear end portion of the inner, forward hitch mounting section 32 slidably within its hollow interior. Typically, the desired range of operational telescoping movement allowed the section 32 from its fully collapsed position in the section 30 to its fully extended position in which the rear end portion is still received within the section 30, is approximately 18 inches, although of course not limited thereto. The forwardmost end of the section 32 mounts the socket coupler component 34 of a conventional ball and socket trailer hitch. A dust boot 36 is preferably provided over the telescoping section 32 and the outer end of the section 30 to prevent dirt, water and other foreign contaminants from collecting on the section 32 that slides within the section 30. This prevents subsequent binding and excessive wear that might result as a consequence of the accumulation of undesirable matter between the sections.

Means is provided for securing the telescoping section 32 releasably in extended, towing position. In the embodiment illustrated in FIGS. 3 and 4 of the drawings, the inner terminal end of the section 32 contained within the larger section 30 is closed by a block 38 provided with a detent 40 as shown. A slotted opening 42 is provided through the larger section 30 configured and positioned to permit access of securing means to the end of the section 32 contained therein when the section 32 is in fully extended towing condition.

Securing means in this particular embodiment comprises a mounting frame 44 attached to section 30, the mounting frame pivotally supporting a threaded nut 46 by pivot 44'. The nut receives an elongated, coarse threaded screw 48 preferably having a blunted end 48'. Tension means, illustrated herein as spring 50, is provided and arranged to constantly urge screw 48 toward a downwardly extending position.

Figure 3:
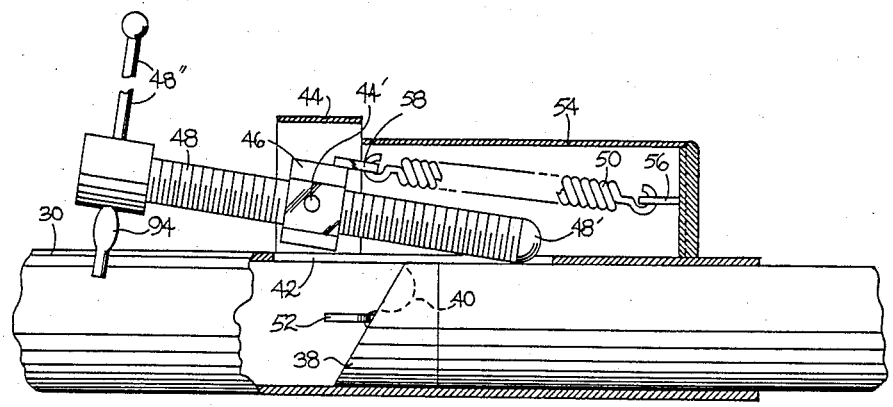
FIG. 3 is a fragmentary side elevation of the telescoping tow bar locking and tightening mechanism shown in unlocked condition, parts being broken away to show internal detail.

As illustrated in FIG. 3, the screw 48 is arranged to align with the opening 42 through the section 30, and therefore slide along the surface of the inner section 32 as the latter is moved telescopically. When the section 32 nearly reaches its fully extended position, the screw end 48' clears the upper end of the sloping block 38, and the tension of spring 50 causes the forward end of the screw to drop downwardly. A guide plate 52 anchored to the block 38 prevents the screw from pivoting too far downwardly, and guides the end 48' into the detent 40. A cover 54 is provided to cover the opening 42 and the securing means from outside elements. The cover also provides an anchor 56 for the spring 50, connected at its opposite end by suitable anchor 58 to the nut 46.

Means is provided to connect the telescoping reach 28 to the cross member 20. In the embodiment illustrated in FIG. 1, a mounting bracket 60 includes hollow sleeve 62 arranged to slidably receive the cross member 20 therethrough. Outwardly projecting flanges 64 are anchored to the sleeve 62, forming a U bracket with the sleeve 62, and the flanges are arranged to receive between them the rearward terminal end of the reach section 30. A pivot bolt 66 extends through bores provided in each flange and the section 30, thereby mounting the telescoping reach securely to the cross bar. It also allows the reach lateral pivotal movement relative thereto, as well as lateral sliding movement on the cross member 20. The tubular configuration of the cross member and the associated mounting sleeve 62 further permits upward and downward pivotal movement of the reach as the mounting bracket 60 rotates axially about the pivot axis of the cross bar 20.

Since the reach is allowed lateral movement along the cross bar, means is provided for locking the mounting bracket 60 into the proper towing position on the cross bar. This towing position requires that the reach be disposed so as to extend from the center of the cross bar, as shown. Locking means embodied herein comprises in part a stop pin 68 projecting from the cross member 20 and positioned thereon to provide an abutment for the sleeve 62 when the latter is slid to the right in FIG. 1 and the reach is positioned centrally on the cross bar. A removable retaining pin 70 is arranged to extend through aligned bores (not shown) in the cross member 20 and the strengthening bar 22 on the opposite side of the sleeve 62 when the latter is abutting the pin 68, thereby releasably locking the bracket 60 therebetween.

Flexible tow line means is provided to support the pulling weight of the vehicle during towing; to limit the outward telescoping of the reach to a desired maximum; and to prevent lateral pivoting of the reach under towing conditions. In this embodiment, a pair of equal length towing chains 72 are connected at one of their ends to opposite lateral ends of the cross member 20, and at the other of their ends to the trailer hitch 34 on the forwardmost end of the telescoping reach.

As shown in FIG. 2 of the drawings, a pivotal connection of each chain to the cross member is preferred, and is accomplished herein through use of an angle connector bracket 74 mounting at one of its ends one of the chains 72. The other end of each connector bracket has enlarged bore 76 which receives a bolt 78 arranged to extend through the bores in the short ends 16' of each member 16, the bolt engaging the nut 26. Pivotal movement of the connector 74 about the bolt is permitted by use of a spacer sleeve 80, slightly longer than the thickness of the connector. This allows the bolt to be tightened securely against the sleeve which abuts the bracket 16, drawing the cross member 20 firmly against the bracket while allowing the connector to freely pivot about the axis of the sleeve.

The bracket 74 at the right end of cross member 20 in FIG. 1 is mounted in similar manner with the exception that the bar 22 terminates inwardly of the cross member 20 which is welded to the bracket 16'. The nut 26 for bolt 78 is welded to bracket 16' instead of to bar 22.

A connector 82 for the opposite terminal end of each chain is provided to clamp the chains to the hitch 34 or the reach section 32, as by bolt 84.

Figures 5, 6, 7, 8:
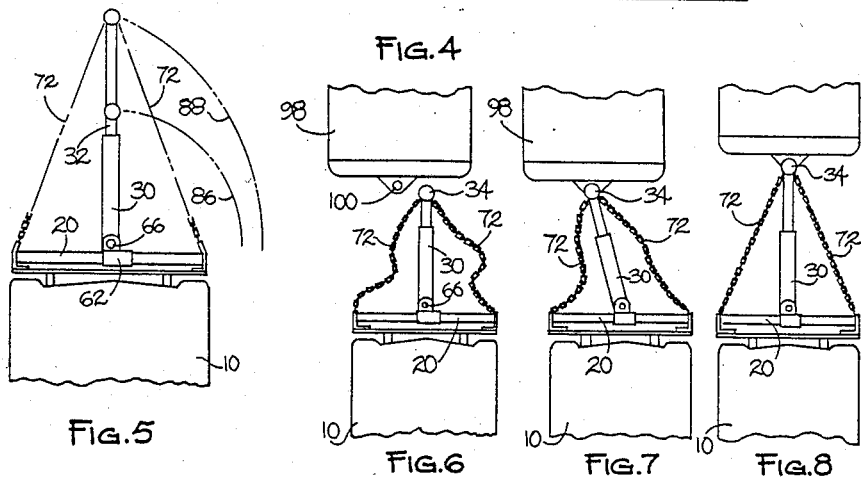
FIG. 5 is a fragmentary plan view in schematic form of a tow bar attached to a vehicle to be towed, the range of movement permitted the tow bar to one of both sides of a towed vehicle in both retracted and extended positions during the hitching operation being indicated by dash lines and dot-and-dash lines, respectively.
FIGS. 6-8 are fragmentary schematic plan views of the tow bar of this invention mounted to a vehicle to be towed, the figures illustrating consecutive hitching steps to a towing vehicle.

The length of the flexible tow line chains 72, thus determines the maximum amount of extension for the reach 28. The chains also determine the outer arc that the reach is permitted when extended and pivoted about pivot pin 66 during positioning prior to coupling to a tow vehicle. FIG. 5 illustrates in broken lines 86 and 88 the available lateral and longitudinal movement that the reach can obtain when retracted and when extended, and still effectively engage the hitch component associated with the tow vehicle.

It is apparent from the drawings that since the chains determine the limits of longitudinal extension allowed the reach, under tow, only the chains themselves effectively pull the towed car. No pulling is accomplished by the reach itself. Therefore the chains must be taut at all times when the hitch is operational. This aspect necessarily returns attention back to FIGS. 3 and 4 where the previous discussion thereof ended with the screw 48 dropped into the confines of section 30 and guided into the detent 40 of the block 38 on the end of section 32.

Figure 4:
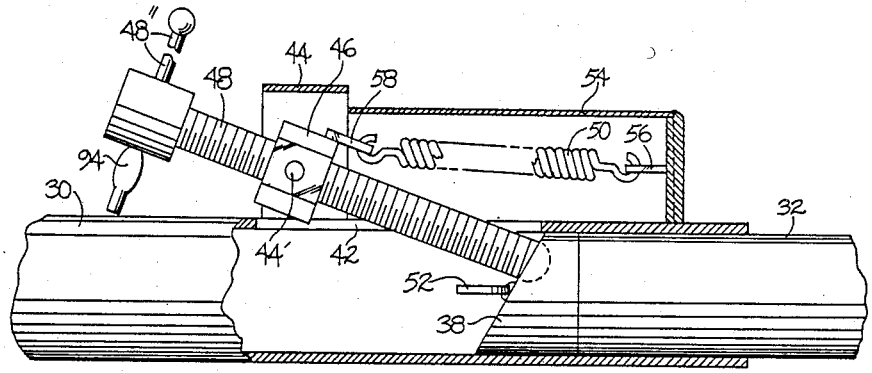
FIG. 4 is a fragmentary side elevation of the apparatus of FIG. 3 but shown in locked and tightened condition as when the tow bar is in operative condition for towing a vehicle, parts again being broken away to show internal detail.

FIG. 4 illustrates the section 32 in fully extended position, limited further outward movement by the fully tensioned chain 72. Tightening the screw 48, pivotally connected to the section 30 by pivotal support assembly 44 and 46, exerts forceful, outward pressure on the end of the section 32, securely locking it to the section 30 and preventing any further inward movement of the telescoping section 32. Further hand tightening of screw 48, by use of cross bar 48", tensions the tow chain, making the resulting triangular tow bar assembly 20, 28 and 72 completely rigid during towing.

Upward and downward pivoting of the assembly about pivots 20 and 80 is allowed for accommodating height variations between vehicles due to road conditions. The reach, locked against collapsing by screw 48, supports the pushing weight of the towed vehicle as in stopping and reversing. In towing cars of greater weights, an intermediate block 90 may be secured between the cross bar 20 and the mounting plate 12 to further strengthen the central portion of the cross bar against bending during towing.

The tow bar of this invention is also arranged, by virtue of its construction, to be collapsed for convenient storage while still mounted on a vehicle. This obviates any need of tools, time and effort in removing the tow bar from the vehicle prior to using the car for transportation.

With the tow bar uncoupled from the towing vehicle, the bolt 48 is loosened to disengage from detent 40, and pivoted upwardly out of the interior confines of section 30. The reach then is telescoped inwardly to its completely collapsed position. The reach is then pivoted upwardly about the axis of the mounting bracket 60 on the cross member 20, and the retaining pin 70 is removed. The reach supporting bracket 60 then is slid to the extreme left along the cross member 20 (FIG. 1) and then pivoted downwardly about pin 66. The reach thus is disposed adjacent and parallel to the cross member, as shown in FIG. 9.

Means is provided to retain the assembly in the storage position thus described. The cross bar 20 and the strengthening bar 22 are provided, as shown best in FIGS. 1 and 2, with aligning bores 92 adjacent the left end. The mounting bracket sleeve 62 is provided with a bore (not shown) arranged to align with the bores 92 when the reach is pivoted vertically 90 degrees from the position shown in FIG. 1, and the assembly is moved to its furthest left position. The retaining pin 70 previously used is again used to intercept this bore in the bracket sleeve 62 and the bores 92 now aligned therewith, to rigidly lock the bracket into the fixed position of FIG. 9.

Means is provided to prevent the screw 48 from turning in or out when in the disengaged position of FIG. 3. This means is provided by the enlarged intermediate portion 94 of the cross bar 48" which presents the adjacent outermost portion of the cross bar as an obstruction which abuts the section 30 in both directions of rotation of the screw. This reminds the operator that the inner tube 32 has not been extended far enough to allow the blunted end 48' to swing downward into the detent 40. The screw 48 may be completely removed from the nut 46 only when the telescoping sections 30 and 32 are in the extended position of FIG. 4.

A chain tray 96 is attached to the mounting plate 12 and extends beneath the cross bar assembly to hold the chains 72 that would otherwise be hanging freely when in the storage position of FIG. 9. A protective and decorative cover (not shown) could be fitted over the entire folded assembly, if desired.

The foregoing description of the tow bar of this invention renders apparent its operation. However, for clarity a brief summary of the operation of the invention follows, and attention is specifically directed to FIGS. 5, 6, 7 and 8 for hitching procedures.

With the tow bar of this invention properly mounted to the frame of a vehicle to be towed, and the reach assembly in stored position thereon, the hitching procedure is as follows: Firstly, a tow car 98 mounting a trailer hitch ball 100 is backed into the near vicinity in front of a car 10 to be towed, or the car 10 is driven forwardly to a position adjacent a tow car 98, as in FIG. 6, within a range illustrated by the broken arcuate lines shown in FIG. 5. The retaining pin 70 is pulled out of the aligned bores 92, the reach is pivoted upward, and the sleeve 62 slid laterally along the cross bar 20 until it abuts stop pin 68. Retaining pin 70 is inserted into the mounting bracket locking bore (not shown) on the cross bar 20, and the reach pivoted downwardly toward the trailer hitch ball 100. The reach is extended appropriately and pivoted about pin 66 until the hitch coupler 34 fits over the ball 100 as in FIG. 7, and the coupler tightened.

The towed car 10 now is backed up, after turning the steering wheel clockwise, until the reach is telescoped outwardly fully and the chains made relatively tight, as in FIG. 8. The locking screw 48 will then have pivoted downwardly under the tension of spring 50 into engagement with detent 40, as in FIG. 4. The screw 48 is then tightened by hand until the chains are tight, and the vehicle is ready for towing. Safety chain and lighting hookup conventional in towing would be connected at this time.

Under load, the tow bar is rigid, and will not allow pivoting about bolt 66. All pivoting during turning is done conventionally by the hitch coupler 34 about the hitch ball 100. Further, pulling force is equalized across the front of the car 10, at the chains connection to the ends of the cross bar 20 and centrally thereon at the mounting bracket 60.

Disconnection and storage of the tow bar follows the reverse procedure discussed above.

It will be apparent to those skilled in the art that various changes may be made in the size, shape, type, number and arrangement of parts described hereinbefored without departing from the spirit of this invention and the scope of the appended claims.

Having thus described my invention and the manner in which it may be used, I claim:

1. For attachment to a vehicle to be towed, a vehicle tow bar, comprising:
    (a) an elongated cross bar member configured for attachment to the front end of a vehicle to be towed and arranged to extend laterally across the front end thereof,
    (b) a forwardly projecting reach mounted at its rear end centrally to the laterally extending cross bar, the reach comprising at least two longitudinally telescoping sections, the reach mounting at its forward end a coupler component of a trailer hitch,
    (c) flexible tow line means connecting the forward end portion of the reach to the opposite ends of the laterally extending cross bar member, and
    (d) securing means engaging the telescoping sections of the reach to releasably lock the sections in fully extended condition for releasably tensioning the flexible tow line means in taut, towing condition.

2. The vehicle tow bar of claim 1 wherein said securing means comprises a screw on one of said telescoping sections arranged to releasably engage and extend the other of said telescoping sections to tension the flexible tow line means.

3. The vehicle tow bar of claim 2 wherein said one telescoping section is hollow and receives the other section telescopically within it, and the securing means includes a nut on the one section rearwardly of the forward terminal end thereof, the nut receiving the screw arranged to extend through an opening in the wall of the one telescoping section and abut the other said telescoping section when the latter is in substantially fully extended position.

4. The vehicle tow bar of claim 1 wherein the laterally extending cross bar member is tubular in configuration and the telescopic reach is mounted on the cross bar member for axial rotation thereabout, for upward and downward pivotal movement of the forwardly telescoping reach.

5. The vehicle tow bar of claim 4 wherein the telescoping reach is further mounted on the laterally extending cross bar by pivot means arranged to permit lateral swinging movement of the reach relative to the cross bar.

6. The vehicle tow bar of claim 5 wherein the reach is further mounted to the cross bar by mounting bracket means arranged on the laterally extending cross bar for sliding movement thereon, and locking means engages said cross bar and said mounting bracket to releasably secure said mounting bracket in various laterally disposed positions on the cross bar.

7. The vehicle tow bar of claim 6 wherein the reach is pivotal to a storage position in which the reach is disposed in collapsed condition adjacent and parallel to the cross bar member, and locking means engages the cross bar member and said mounting bracket to releasably secure the reach in said storage condition.

* * * * *